May 1, 1934.  H. K. FAIRALL  1,956,947
MOTION PICTURE CAMERA
Original Filed Dec. 31, 1929   6 Sheets-Sheet 1

INVENTOR.
Harry K. Fairall
BY
Arthur D. Larrabee
his ATTORNEY.

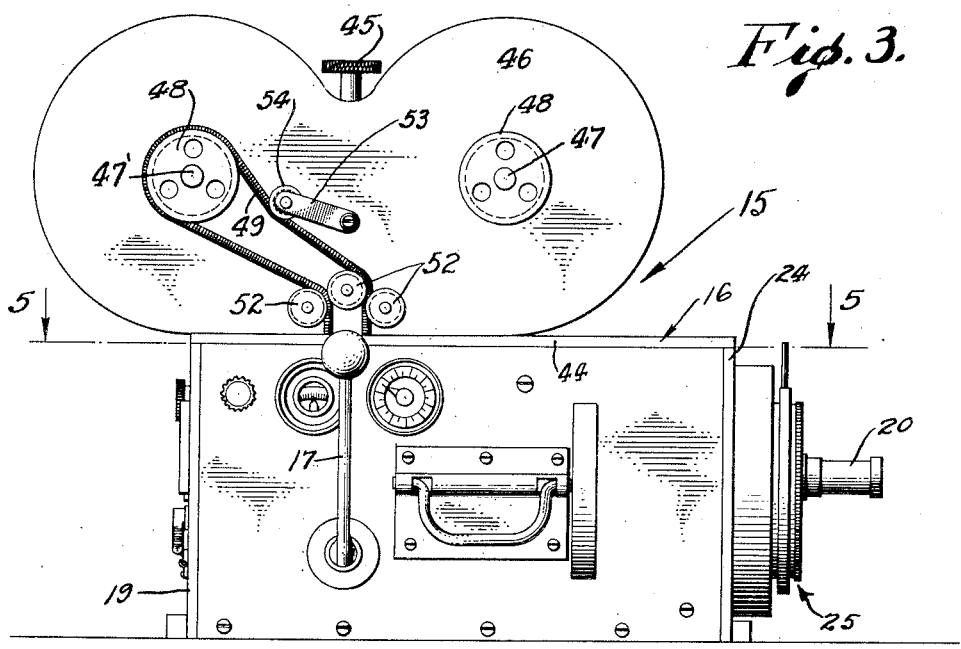
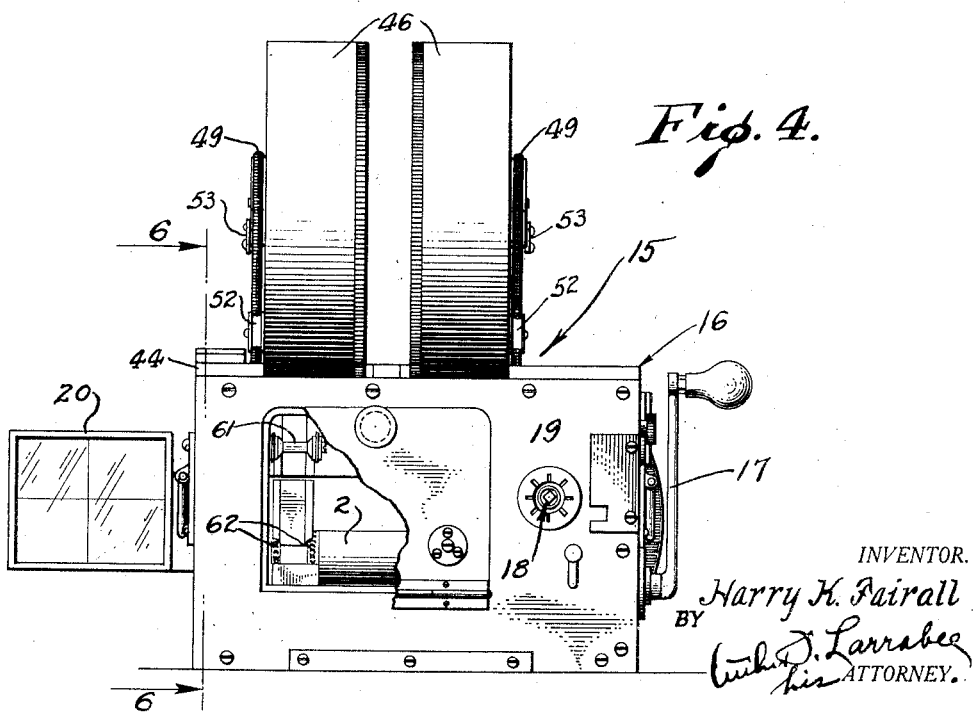

May 1, 1934.  H. K. FAIRALL  1,956,947
MOTION PICTURE CAMERA
Original Filed Dec. 31, 1929   6 Sheets-Sheet 3
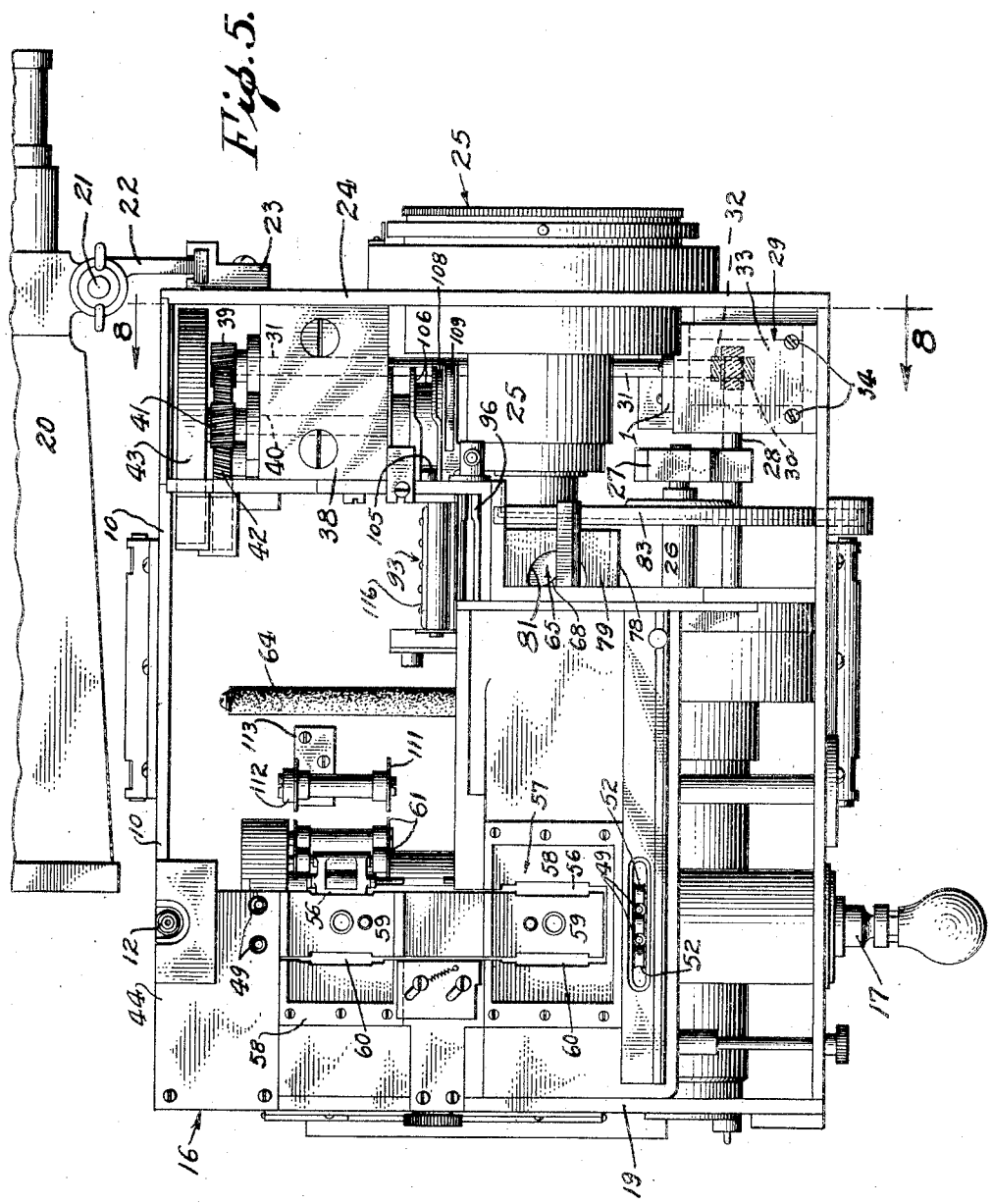
INVENTOR.
Harry K. Fairall
BY
Larrabee
his ATTORNEY.

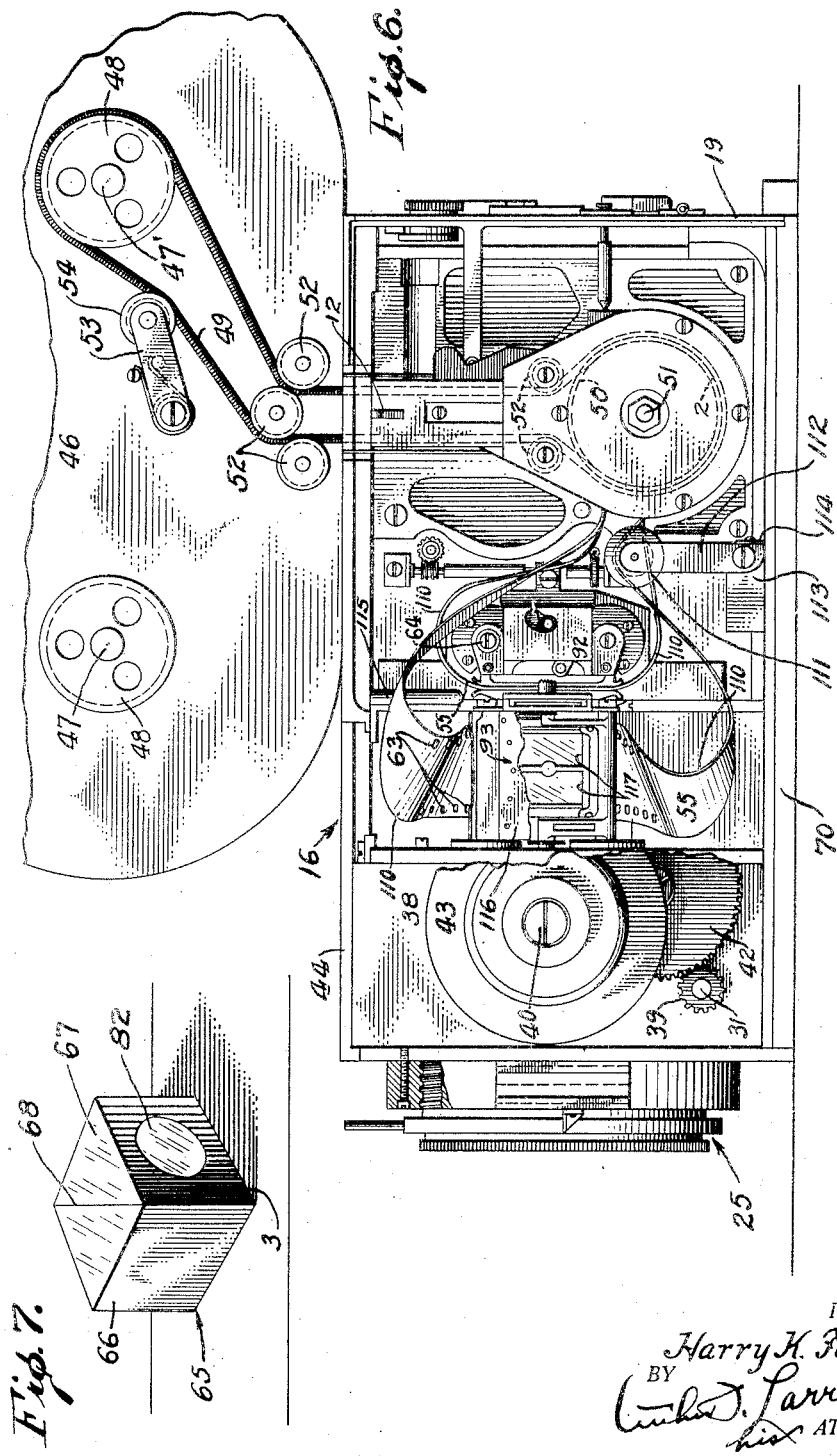

May 1, 1934.                    H. K. FAIRALL                    1,956,947
                            MOTION PICTURE CAMERA
                 Original Filed Dec. 31, 1929      6 Sheets-Sheet 5
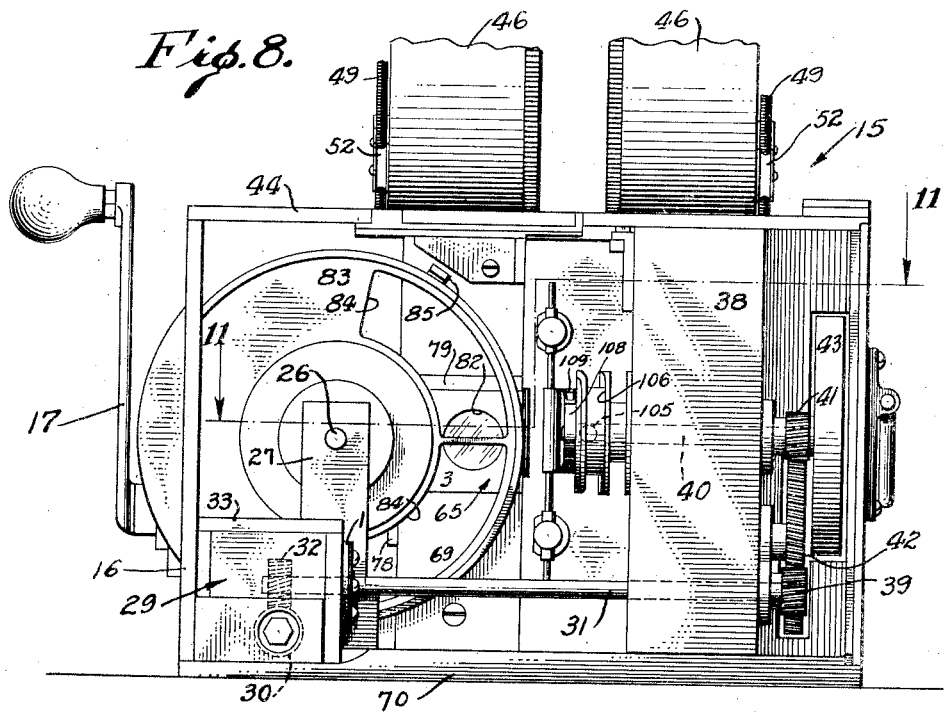
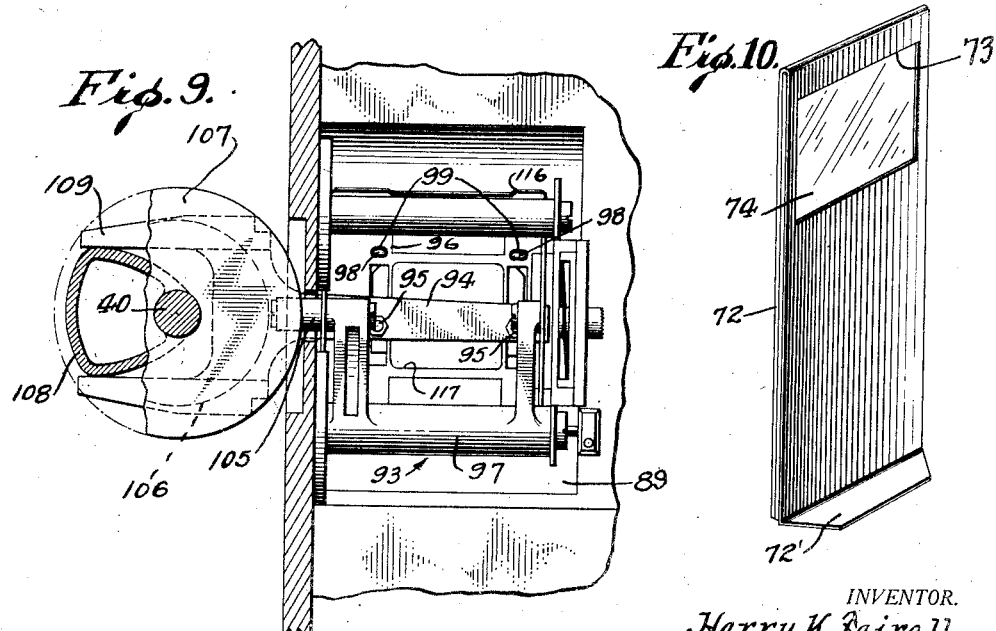
INVENTOR.
Harry K. Fairall
BY
ATTORNEY.

May 1, 1934.                    H. K. FAIRALL                    1,956,947
                            MOTION PICTURE CAMERA
                    Original Filed Dec. 31, 1929    6 Sheets-Sheet 6

INVENTOR.
Harry K. Fairall
BY
ATTORNEY.

Patented May 1, 1934

1,956,947

UNITED STATES PATENT OFFICE 1,956,947

MOTION PICTURE CAMERA

Harry K. Fairall, Hollywood, Calif., assignor to Harriscolor Films, Inc., Jersey City, N. J., a corporation of New Jersey Application December 31, 1929, Serial No. 417,610
Renewed September 13, 1933

16 Claims. (Cl. 88—16.4)

My invention relates to cameras and particularly to motion-picture cameras adapted for taking motion pictures in their natural colors.

An object of my invention is to construct and arrange a novel optical system in a camera in combination with the shuttle system thereof so that two negatives, identical, of the same object or objects, may be simultaneously taken through the medium of a single lens in the camera.

An object is to construct and arrange a camera so that only a minimum of light is necessary for producing two perfect negatives at the same time by a single camera.

Another object to to provide a common means for simultaneously operating two separate shuttle systems in a camera.

Another object is to accurately position two film negatives in a single camera for simultaneous exposure and to provide novel means whereby each negative may be simultaneously and completely filtered independently of the other.

A further object is to construct and arrange a camera so as to simultaneously obtain two negatives identical of the same object from the same focus point.

A still further object is to construct and arrange a camera so that better pictures may be taken by means of a single camera operated by one operator than by means of two cameras operated by different operators at different operating or focus points.

A feature of the invention resides in providing a single camera with novel means whereby two completely and separately filtered negatives may be simultaneously obtained through a single lens and from the same optical or focus point.

Another feature resides in the novel means for mounting a color screen in the camera relative to the negative that receives the image.

A further feature of my invention resides in the provision of a novel camera whereby in making black and white negatives, one cameraman and his assistant will be able to obtain the customary two negatives, and from the same optical or focus point; whereas heretofore it has required two cameramen and an assistant for each to obtain the customary two negatives and then from different focus points which did not give maximum satisfaction.

Other objects, advantages, and features of invention may appear from the accompanying drawings, the subjoined detail description and the appended claims.

The accompanying drawings illustrate the invention in a form I at present deem preferable.

Fig. 3 is a side elevation of the camera as viewed from the reverse side of Fig. 1.

Fig. 4 is a rear elevation of the camera, a portion of the rear door for the camera housing being broken away in order to show parts of the interior mechanism.

Fig. 5 is a view on enlarged scale taken on a plane indicated by line 5—5 and a direction indicated by the arrows in Fig. 3.

Fig. 6. is a view on enlarged scale taken on a plane indicated by line 6—6 and in a direction indicated by the arrows in Fig. 4. Parts are broken away to contract the view and to show structure that would otherwise be concealed from view.

Fig. 7 is an isometric perspective detail view of the prism set used in the camera.

Fig. 8 is a view on enlarged scale taken on a plane indicated by line 8—8 and in a direction indicated by the arrows in Fig. 5, the camera being shown without the lens therein, and the film magazines being broken away to contract the view.

Figure 1:
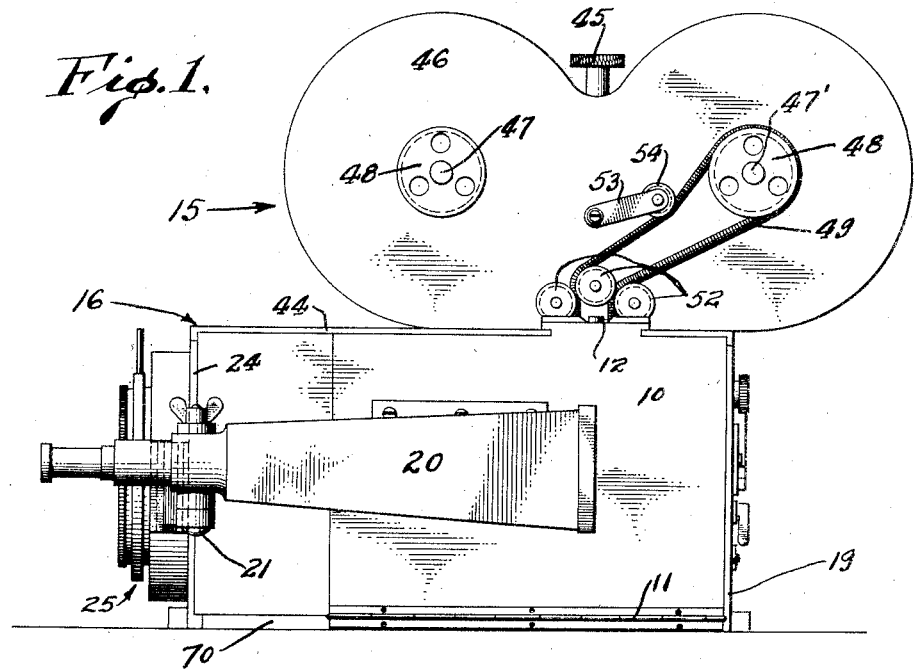
Figure 1 is a side elevation of a motion-picture camera constructed according to my invention.
Figure 2:
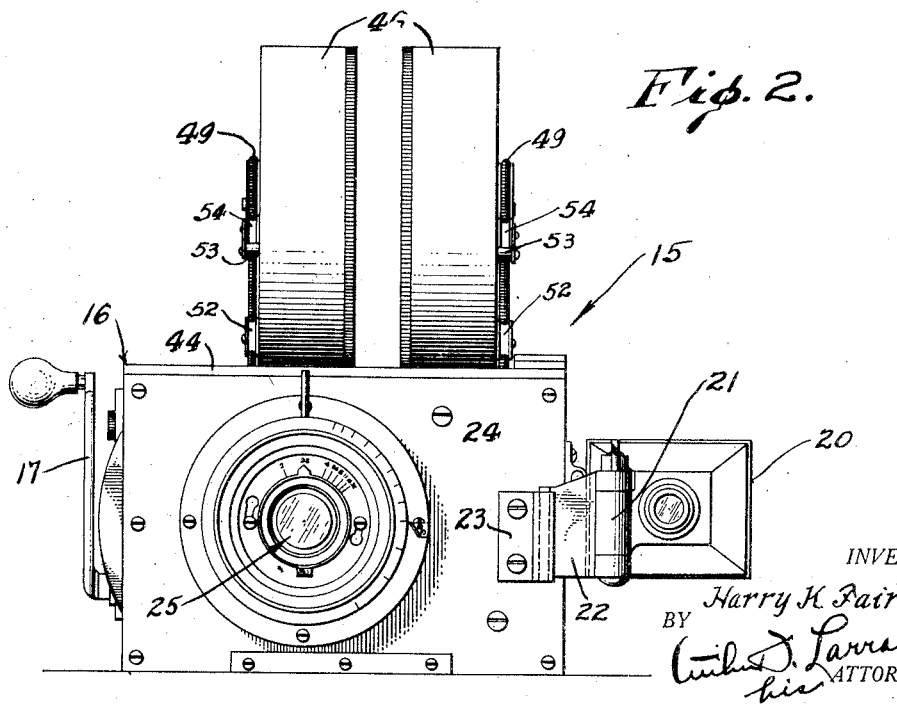
Fig. 2 is a front elevation of the camera.
Figure 11:
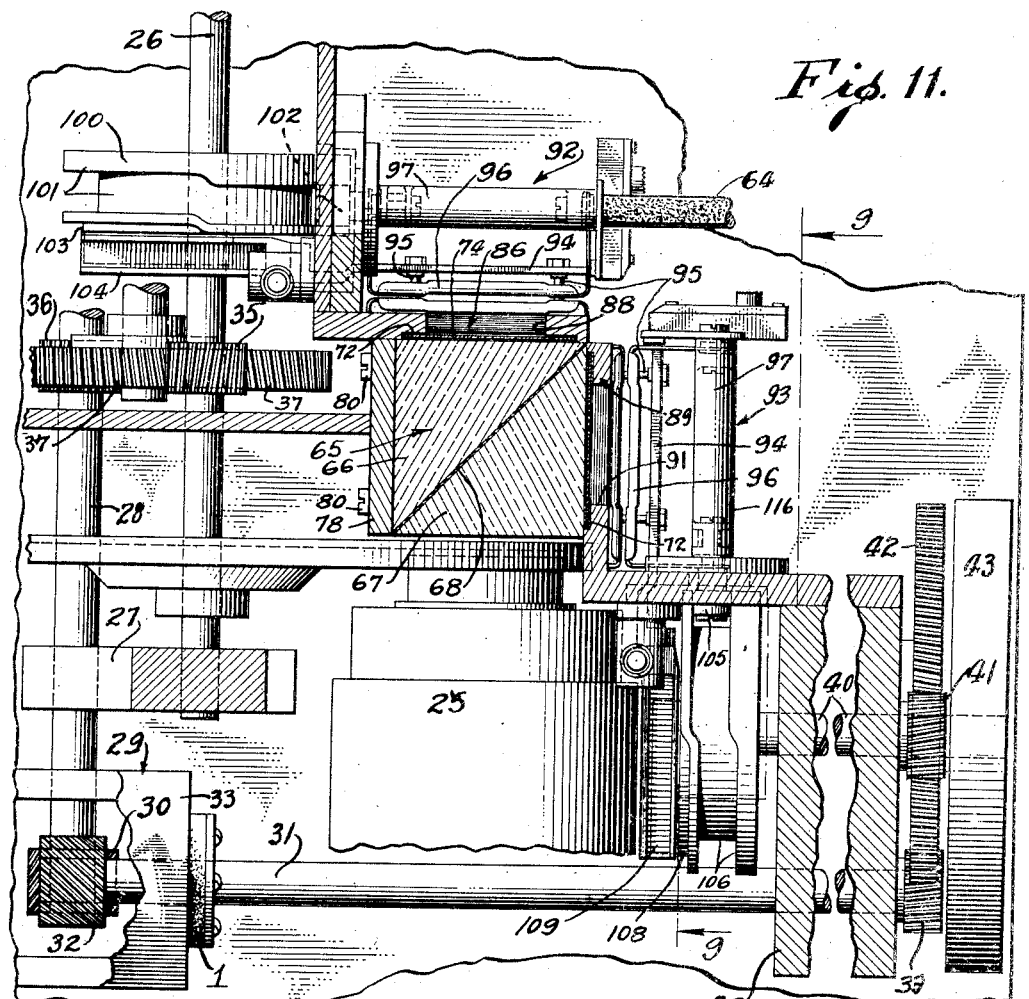

Fig. 9 is a fragmentary and partly sectional view taken on irregular line 9—9 and in a direction indicated by the arrows in Fig. 11.

Fig. 10 is a detail perspective view of one of the color filter screens and its holder.

Fig. 11 is a fragmental view on enlarged scale taken on irregular line 11—11 and in a direction indicated by the arrows in Fig. 8. Parts are broken away to contract the view and to show interior construction, and other parts are shown in plan to more clearly show their relative positions.

Figure 12:
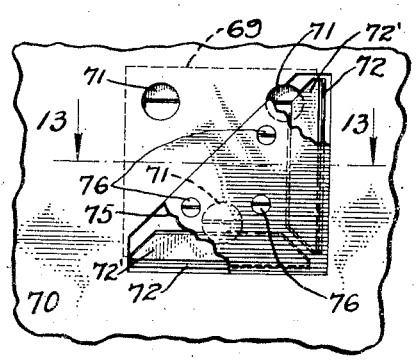

Fig. 12 is a bottom plan of a portion of the camera housing directly under the prism set, portions being broken away in order to show the manner of mounting the prism set and the color filter screen and holder in the camera.

Figure 13:
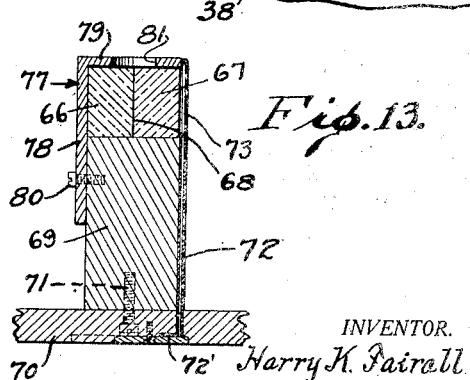

Fig. 13 is a sectional view taken on a plane indicated by line 13—13 and in the direction indicated by the arrows in Fig. 12.

A camera constructed according to my invention is indicated in the drawings in a general way by the numeral 15. This camera is shown as being of the type capable of taking pictures of objects in motion and as including a housing 16 for enclosing essential parts of the camera. As is usual in cameras of this type, the film-moving mechanism may be operated manually by a crank 17 or may be electrically driven by means of a suitable connection 18 in the rear wall 19 of the housing and which connection 18 is adapted to receive the usual flexible shaft driven by any suitable electrical motor.

The camera 15 is provided with a view finder 20, which is of a conventional type and is pivotally mounted, as at 21, upon an arm 22 detachably held in the usual manner in a bracket 23 on the front wall 24 of the housing 16, and the camera has also mounted longitudinally therein a lens 25, which is of the usual type and extends with its forward end through the front wall 24.

The electrical-drive connection 18 is at the rear end of a shaft 26 which is suitably journaled at such end and extends longitudinally into the housing 16. The shaft 26 is journaled at its forward end in a support 27, in which is also journaled a shaft 28, which extends in parallelism with shaft 26 and forward thereof through one side wall of a box 29 containing a suitable lubricant and carrying on its forward end and in said box 29, a gear 30. Another shaft 31 is positioned substantially at right angles to the shaft 28, and is journaled in another side wall of the box 29, the shaft 31 having fastened on its end portion in the box a gear 32 so that the latter is in mesh with gear 30 and adapted to be driven thereby.

The box may be constructed in any suitable manner so as to make the gears 30 and 32 accessible and to make assembling of the gears on the shafts possible within the box. For instance, the box may be provided with a cover plate 33 secured at the top of the box by any suitable means, such as screws 34. A suitable packing ring 1 prevents lubricant from box 29 escaping around shaft 31.

Upon an intermediate portion of the shaft 26 is a gear 35, and in a plane therewith is similarly fixed upon the shaft 28 a gear 36, while a suitably mounted idler gear 37 is in mesh with both gears 35 and 36 so that the shafts 26 and 28 are rotatable at the same speed and in unison with each other. Adjacent to the end opposite to the end portion within the box 29, the shaft 31 is journaled in a support 38 and extends therethrough and has fixed thereon a gear 39 similar to the gear 36 on the shaft 28. A shaft 40, extending in parallelism with shaft 31, has an intermediate portion thereof journaled in the support 38 and has fixed thereon in a plane with the gear 39, a gear 41 similar to the gear 35 on shaft 26. An idler gear 42, similar to idler gear 37, is mounted so as to mesh with the gears 39 and 41 in order to cause the shafts 31 and 40 to rotate at the same speed and in unison with each other, and consequently also at the same speed as, and in unison with, the shafts 26 and 28. For the purpose of balancing the rotary movement of the shafts the shaft 40 has mounted on its outer end a fly or balance wheel 43. It should also be understood that the crank 17 is detachably mounted in any approved manner upon a shaft which has a suitable gear connection, not shown, with the gear mechanism just described.

At convenient places, preferably on the top plate 44 of the housing 16 and longitudinally and at the rearward end, of the latter, are suitably secured, as by screws 45, two magazines 46, adapted to receive therein upon respective shafts 47, 47' the usual reels, not shown, for the exposed and the unexposed films 55. A pulley 48 upon each shaft 47, 47' and a belt connection 49 with a respective drive-pulley 50 on a shaft 51, which is suitably connected with the gear mechanism before described, serves as means for rotating the respective shafts 47, 47' and thereby causing the winding of the films upon the respective reels in a manner well known in the art. Idler pulleys 52 for guiding each belt 49 are provided, and a spring-actuated pivotal arm 53, which has mounted thereon at its free end a belt-contacting pulley 54, serves as means for holding each belt properly tensioned, the pivotal mounting of each arm being such that the respective pulley 54 is brought into tensional contact with the belt whether the latter is looped over the pulley on the shaft 47' for the take-up reel or over the pulley on the shaft 47 for reverse movement of the film.

Each of the films 55 in the respective magazines 46, one of which is preferably positioned transversely of the axial plane of the lens 25 and rearward of the latter, is threaded from the reel for the unexposed film through openings 56 in the throat plate 57 formed by plates 58 and 59 secured to the housing 16 at the rear of top cover plate 44. Openings 60 for guiding the respective film to the take-up-reel in the respective magazines 46 are similarly formed by the plates 58 and 59 rearward of each opening 56. Each film is guided by a series of flanged idler rollers 61, and sprocket wheels 62 formed on the barrel 2, one wheel 62 for each film, and spaced therealong in alignment with openings 56, 60. The sprocket wheel teeth engage the usual marginal perforations 63 in the respective films and serve as means for uniformly leading the films to and from the camera shuttle mechanisms. In the camera is also transversely arranged a bar 64, over and from which one of the films 55 travels to its respective exposing positions in relation to the lens 25.

Rearward of the lens 25 and included therewith in the optical system of the camera is a prism set or cube 65, which comprises two sections 66 and 67, joined to each other in the diagonal plane of the cube and having between their diagonal surfaces a layer 68 of a suitable material that allows light rays both to pass therethrough and to be reflected therefrom. For instance, the layer may be of platinum or silver and is preferably of such a thickness as to allow approximately one-half of the light rays that enter the prism set to pass directly therethrough and to cause the other half to be reflected from the layer so as to pass at right angles to the direct rays through the prism set. The cube 65 has an opaque front surface 3 leaving however a circular central open portion 82 so that a preponderance of light will not enter the prism.

Within the housing 16 is a prism mounting block 69, which is secured upon the bottom 70 of the housing 16 by any suitable means, such as screws 71, and the prism set is cemented or otherwise secured in correct position on top of the block. The underside of the bottom 70 of the camera housing is recessed on its side opposite the block 69, and the bottom is also provided with slots which are at right angles to each other and register with the respective sides of the block and the prism set. Each of these slots is adapted to receive and hold a filter plate 72 slidably therein. The plates 72 are flanged at one end, with the flange 72' at rest in the recess of the bottom and said plates have therein adjacent to its opposite end, an opening 73 which registers with a respective exit side for the light rays from the prism set when the plate 72 is in its correct position in the camera housing, and each plate 72 is adapted to hold a suitable color filter 74 preferably slidably mounted therein so that the light rays that pass through the opening 73 also pass through the color filter before being received on the film to be exposed.

A plate 75, fitted in the recess of the bottom 70, is secured to the bottom by any suitable means, such as screws 76, and presses upon the flanges 72' of the plate 72, thereby holding the plates in their correct positions and also retaining the color filters within the plates. Whenever it is desired to change color filters in the plates 72, the removal of the plate 75 provides easy access to the plates 72 so that the color filters may be easily and quickly exchanged from the outside of the camera for others of a different color.

It is desirable to provide means not only for holding the prism sections 66 and 67 in their correct positions, but also for exactly determining their positions before the cement sets that holds them to the block 69. Such means is shown in the form of a bent member 77, one arm 78 of which is adapted to extend alongside of and be secured to the block 69, while the other arm 79 of the member 77 presses upon the top of the prism preferably over both sections 66 and 67. The member 77 being secured to the block 69 by screws 80. The arm 79 of the member 77 has therein an opening 81 which enables a person to "feel" the prism sections into place to obtain a correct position of the angle at which the light rays bisect the prism set. After the prism set has been placed so that the light rays will pass therethrough in the proper directions for the taking of true pictures by the camera 15, the opening 81 may be filled with shellac or some other suitable substance adapted to cement or securely hold the prism set in assembled position on the block and to thereby prevent accidental displacement of the prism set.

The prism section 67, as shown in Fig. 7, and which faces the lens 25 has thereon means so as to prevent an excessive amount of light from passing through the prism set. In fact as shown, light rays cannot pass through the prism set except through a central circular spot 82 which is formed on the surface of the prism section toward the lens and is of a diameter sufficient for allowing only enough light to enter the lens in order to make it possible to obtain perfect pictures.

A shutter 83 is fixed upon the shaft 26 in position that the shutter is adapted to revolve between the prism set 65 and the inner end of the lens 25. This shutter is conventional in design and is provided with an opening 84 for allowing light to pass therethrough and to enter the lens when the opening registers with the lens. The shutter has cooperative therewith the usual brake 85 to stop rotation of the parts when the operating power is removed.

An aperture plate 86 for one of the films 55 is suitably mounted in the camera so as to be in a transverse plane to the axis of the lens 25 and rearward thereof and of the prism section 66 and is provided with an exposing aperture 88 to permit the correct space of exposure on the film portion behind the plate 86. The aperture plate 86 also serves as means for slidably holding one of the filter plates 72 against one side of the prism 65 and the opening 73 therein registers with the exposing aperture 88 in the plate 86. Another aperture plate 89, similar to the plate 86 is suitably mounted in the camera along one side of the prism 65 so as to be in a plane virtually at right angles to the plate 86 or in a plane parallel with the axial plane of the lens.

The aperture plate 89 also serves to slidably hold the other filter plate 72 against one side of the prism 65 and is provided with an exposing aperture 91, which registers with the aperture 73 in its cooperating filter plate 72. With the apertures in the respective plates 72 in register with and directly in rear of the apertures in plates 86 and 89, through the medium of the respective color filters 74, the desired color filtrations will be obtained on the film exposed by light rays passing through the exposing apertures.

In order to effect the usual intermittent movement of the film portions past the exposing apertures, and in order to properly hold the films at the time of their being stopped for exposure, a shuttle system or mechanism 92 is provided for the film that travels in rear of the plate 86 and a shuttle system or mechanism 93 is provided for the film traveling in rear of the plate 89. These shuttle mechanisms may be of a conventional type and therefore, need not be described in detail herein. However, each of the shuttle mechanisms includes a traveling bar 94, which carries pins 95 that enter certain of the film perforations 63; a register leaf 96 which guides the respective film at the respective aperture plate, and a rocking or oscillating element 97, pivotally connected with the register leaf so as to effect the backward and forward movements of the register leaf, or in other words the movements of the register leaf toward and away from the respective aperture plate in the usual manner, as well as the movement of the pins 95 into and out of the film perforations 63. Pilot pins 98 are provided so as to engage the film perforations 63 and are received in the register holes 99 in the register leaf 96 in order to cause the respective film to be held in proper position relative to the exposing aperture at the time of exposure. However, it should be noted that, although the shuttle mechanisms are similar in general arrangement of parts, they are mounted at right angles to each other and so that the shuttle mechanism 92 is operatively connected with the shaft 26, while the shuttle mechanism 93 is operatively connected with the shaft 40.

For the purpose of operating the shuttle mechanism 92 the shaft 26 has thus fixed thereon a cam wheel 100, peripherally provided with a cam groove 101, and the rocking element 97 of the shuttle mechanism has a roller-carrying shaft extension 102 in engagement with the cam groove so that, when the shaft 26 rotates, the register leaf in its respective mechanism causes the film therein to press against the aperture plate 86 during a predetermined period, and during another period strips the film from the pilot pins 98 and allows the film to travel freely through the shuttle. A cam 103, which may be a lateral extension on the wheel 100, is arranged so as to engage a yoke 104 connected to the bar 94 of the shuttle mechanism and such cam 103 through yoke 104 effects the up-and-down movement of the traveling bar so as to feed the film step by step during the period when the film is free from the pilot pins to travel through the aperture plate.

A roller-carrying shaft extension 105 on the rocking element 97 in the shuttle mechanism 93 similarly engages a peripheral cam groove 106 in wheel 107 on the shaft 40, and a cam 108 on the latter shaft engages a yoke 109 on the bar 94 of mechanism 93, so that such mechanism 93 serves the same purpose relative to the film 55 at the side of the prism 65 as the mechanism 92 does relative to the film in rear of the prism 65. A further description of the shuttle mechanism, therefore appears superfluous, it being, of course, understood that the temporary stopping of the films by the operation of the shuttle mechanisms coincides with the registering of the shutter opening 84 with lens 25 and that the intermittent movement of the films occurs when the shuttle opening is out of registration with the lens.

From the rollers 61, the films are threaded through the respective register leaves 96 in the respective shuttle mechanisms 92 and 93 in the usual manner. In the threading of the films, it is, of course, necessary to observe that the films are sufficiently looped at certain portions before they enter the register leaves and at certain portions after having passed therethrough in order to assure the proper running of the films in the camera past the exposing apertures.

The film that is thus threaded past the aperture plate 89 and through the register leaf 96 in the shuttle mechanism 93 at the side of the prism section 67, may have in addition to the flanged wheel 61, an additional means in the form of a flanged roller 111 for guiding the film, by which it is fed or guided to the take-up reel in its respective magazine 46. This roller is preferably mounted at one end of an arm 112, which at its other end is pivotally fastened to a block 113 fixed to the bottom 70 and is arranged so that the pivoted end forms a stop for the arm in its vertical position, while a flat spring 114 is provided, which normally holds the arm in the vertical position and also permits the swinging of the arm from the vertical position in order to facilitate the threading of the film over the roller 111. The film through shuttle mechanism 93 is kept from interference with other parts in the camera and guided in its passage to its exposing aperture by looping the same over the transverse bar 64 that is rubber coated to prevent scratching of the film and which extends from one side of the shuttle mechanism 92; and in also passing the said film on one side, as shown in Fig. 6, of a pin 115 that is secured to and extends downwardly from the underside of the top plate 44 of the housing 16.

It is obvious from the foregoing description that, with the films properly placed in the respective magazines, and properly threaded through the camera, when the gear mechanism is operated by the crank 17 or by an electric motor through the medium of the connection 18, the film that is threaded behind the prism section 66, and the film that is threaded at the side of the prism section 67, will run simultaneously and at the same speed through the camera. It is also clear that the shuttle systems 92 and 93 will operate in synchronism with each other.

Since the prism set 65 is constructed, as before described, so that one-half of the light rays that pass through the lens 25 will pass directly and straight through the prism 65, while the other half of the light rays will be deflected by the deflecting surface 68 and pass through the section 67 of prism 65 and in a right-angular direction to the first-mentioned half of the rays, the object images caused to appear on the exposed portions of the films in the picture square will be exactly alike in every detail when black and white negatives are produced by removal of the filter plates 72; and such object images will be identical on the exposed portions of the two films when the filter plates 72 are used, except for filtration of the light rays corresponding to the color filter 74 used.

A door 10 hinged at 11 provides easy access to the interior of the camera housing when threading the film therein. Catch means 12 securely holds the door in closed position.

Since, further, two negatives of moving objects may be thus taken from a common focus point by the camera 15 of my invention, it is evident that the camera has decided advantage over other hitherto known motion-picture cameras, of which two must be placed in different positions in order to simultaneously produce two negatives of moving objects, the negatives produced by one of the cameras thus being more or less distorted in its views of the objects shown in the negatives produced by the other camera.

A guard plate 116 pivotally connected to the shuttle mechanism 93 is adapted to hang in rear of the film passing through the shuttle mechanism 93 and prevents any light rays that may be strong enough to pass through the film being exposed, from affecting any portion of the film 55 that may by chance be looped in rear of the exposing aperture 91. This is used because the register leaf 96 in mechanism 93 is cut-away as at 117 to provide means to focus the camera, and in this respect focusing of the camera through the cut-away portion 117 accurately focuses both exposing apertures.

A feature of the invention is that by providing a removable prism set, I am able to easily and quickly balance the negatives exposed to obtain desired color filtration, that is to say, in the event the respective filter plates 72 are not of the appropriate density to obtain balanced negatives with the amount of light permitted to be deflected and pass through the prism set by the layer 68 of silver or the like the prism set may be easily and quickly removed and another set 65 having either a lighter or heavier reflecting surface 68 may be inserted to obtain the proper balance of the negatives.

I claim:

1. An optical system for a camera, comprising a lens; means to move a pair of photographic films in two different planes in rear of said lens; means for holding the films in exposing positions relative to said lens; and means whereby selected light rays from said lens will be directed toward said films to expose the same including a masked prism and interposed selective filters adapted to be removed and inserted through special apertures in the camera.

2. An optical system for cameras, comprising a lens; a prism set mounted behind the lens; a light mask for said prism; a pair of photographic films; removable color screens between said prism and films for selecting light rays said screens being adapted to be removed through special apertures in the camera, and means for holding the films in exposing positions relative to the optical system and in planes substantially at right angles to each other, so that each film may be simultaneously exposed by selected light rays from said prism set.

3. An optical system for motion-picture cameras, comprising a lens; color separation filters removably inserted between said lens and a film, adapted to be inserted and removed from the outside of the camera through special apertures in the camera; a prism set including a mask mounted behind the lens for separating color images; a plurality of photographic films; a shuttle system for each film; a mechanism for operating the shuttle systems in synchronism and for feeding the films synchronously through the camera; and means for holding the films in exposing positions relative to the optical and filter system and in planes at different angles, so that separate selected color images of the same object or objects may be simultaneously recorded upon each film through said prism set.

4. An optical system for cameras, comprising a housing; a lens; means adapted to move a pair of photographic films in two different planes relative to said lens; means whereby said film is adapted to be simultaneously exposed in both planes comprising a masked prism between the lens and films; and interchangeable means adapted to be inserted and removed from the exterior of the camera housing through special apertures in said housing whereby exposures of said film in either or both planes may be filtered for color separation.

5. An optical system for cameras, comprising a lens; a prism set including a prism mask operably mounted relative to the lens; a plurality of photographic films; a removable color filter for each film; means for inserting, removing and holding the color filters adjacent to the prism set and in planes at different angles comprising slots accessible from the outside of the camera; and means for holding the films in exposing positions in planes substantially parallel with the respective color filters, so that an image of an object or objects may be simultaneously recorded in desired color filtrations upon each film.

6. An optical system for motion-picture cameras, comprising a lens; a masked prism set operably mounted relative to the lens; a plurality of photographic films; a shuttle system for each film; a mechanism for operating the shuttle systems in synchronism and for feeding the films synchronously through the cameras; a removable color filter for each film; means for holding the color filters adjacent to the prism set and in planes at different angles; means for inserting and removing said filters from the outside of said camera including slots and a cover for said slots; and means for holding the films in exposing positions in planes substantially parallel with the respective color filters, so that an image of an object or objects may be simultaneously recorded in desired color filtration upon each film.

7. An optical system for motion-picture cameras, comprising a lens; a masked prism set operably mounted relative to the lens; a pair of photographic films; a shuttle system for each film; a mechanism for operating the shuttle systems in synchronism with each other and for feeding the films synchronously through the camera; a removable color filter for each film; means for holding the color filters adjacent to the prism set and in planes substantially at right angles to each other; means for inserting and removing said filters from the outside of said camera including slots and a cover for said slots; and means for holding the films in exposing positions in planes substantially parallel with the respective color filters, so that an image of an object or objects may be simultaneously recorded in desired color filtration upon each film.

8. An optical system for motion-picture cameras, comprising in combination a lens; a prism set constructed and arranged to cause substantially one-half of the light rays that pass through the lens to pass directly through the prism set and to cause the other light rays to pass through the prism set at an angle to the first-mentioned rays by means of a superimposed reflecting element within said prism set; a pair of photographic films; a shuttle system for each film; a mechanism for operating the shuttle systems in synchronism with each other and for feeding the films synchronously through the camera; means for holding one of the films in position for exposure to the direct rays; and means for holding the other films in position for exposure to the reflected rays, so that an image of an object or objects may be simultaneously recorded upon each film; means to filter separately the direct and reflected rays prior to their reaching the films, comprising removable filters adapted to be inserted and removed from their position between the prism and the films, by means of slots having a cover, from the outside of the camera.

9. An optical system for cameras, comprising in combination a lens; a masked prism set including a reflecting element constructed and arranged so as to cause substantially one-half of the light rays that pass through the lens to pass directly through the prism set and to cause the reflected light rays to pass through the prism set at an angle to the first-mentioned rays; a pair of photographic films to receive said rays; a removable color filter for each film; means for holding one color filter adjacent to the prism set so as to permit the direct rays to pass therethrough; means for holding the other color filter adjacent to the prism set so as to permit the reflected rays to pass therethrough; means for holding one of the films in position for exposure to the direct rays that pass through one of the color filters; means for holding the other film in position for exposure to the reflected rays that pass through the other color filter, so that color separated images of an object or objects may be simultaneously recorded upon each film; and means for inserting and removing said filters from outside the camera, comprising slots and a cover for said slots.

10. An optical system for motion-picture cameras, comprising in combination a lens; a masked prism set constructed and arranged with an interposed reflecting element so as to cause substantially one-half of the light rays that pass through the lens to pass directly through the prism set and to cause the reflected light rays to pass through the prism set at an angle to the first-mentioned rays; a pair of photographic films; a shuttle system for each film; a mechanism for operating the shuttle systems in synchronism with each other and for feeding the films synchronously through the camera; color filters adapted to be inserted and removed from outside the camera through special apertures in the camera, and interposed—color separation; means for holding one color filter adjacent to the prism set so as to permit the direct rays to pass therethrough; means for holding the other color filter adjacent to the prism set so as to permit the reflected rays to pass therethrough; means for holding one of the films in position for exposure to the direct rays that pass through one of the color filters; and means for holding the other film in position for exposure to the reflected rays that pass through the other color filter, so that a color separated image of an object or objects may be simultaneously recorded in desired color filtration upon each film.

11. A camera, comprising a housing, a lens mounted in said housing; a masked prism adjacent said lens to divide projected images; shuttle means adapted to move photographic film past said lens and prism; a removable color filter; and means whereby said color filter may be inserted between said prism and said films and removed therefrom, from the exterior of said housing by means of slots, and a cover, for said slots.

12. In a camera, the combination of a lens; a plurality of shuttle mechanisms for holding and moving film past said lens and each including a register leaf; a prism for directing light rays from said lens to simultaneously expose the film in each shuttle mechanism; the register leaf of one shuttle mechanism having a cutaway portion through which the camera may be focused; and a guard plate pivoted to said last mentioned shuttle mechanism to cover said cutaway portion and prevent light rays from passing in rear of said shuttle mechanism to which said plate is pivoted.

13. A motion picture camera comprising a lens, a prism adjacent said lens and having a masked portion to prevent extraneous rays of light entering therein and having an interposed reflecting element, film races at angles to said lens and adapted to have films passed therethrough by a shuttle mechanism, color separation filters disposed between the prism and said film races; and adapted to be removed and inserted through special apertures in the camera; means to transmit controlled rays from said lens to the films comprising said masked prism.

14. A motion picture camera comprising a lens, a prism adjacent said lens and having a masked portion to prevent extraneous rays of light entering therein and having an interposed reflecting element, film races at angles to said lens and adapted to have films passed therethrough by a shuttle mechanism, color separation filters disposed between the prism and said film races; means to transmit controlled rays from said lens to the films comprising said masked prism; means to selectively filter said rays between said masked prism and the films comprising said filters; and means to insert and remove said filters to and from their position between said prism and the films comprising slots extending from the exterior of said camera to said position and normally enclosed by a light proof cover, readily removable for access to said slots.

15. In a motion picture camera the combination with a lens, a camera housing in which said lens is mounted, film races and shuttle mechanism in said housing, adapted to pass films past said lens; and a shutter operating between said lens and said films; of a masked prism between the shutter and the films having a reflecting element incorporated therein; and removable filters between the prism and the films; means to transmit rays through said prism free from marginal rays as controlled by said prism mask; means to filter said rays for color separation comprising said color filters; means to maintain said filters in a plane relation to the films comprising frames for said filters and slots for the support of said frames; means to remove said frames from said slots from the outside of said camera housing comprising flanges at one end; and means to removably cover said flanges and said slots comprising a cover secured thereover.

16. A motion picture camera comprising a camera housing, a lens mounted in said housing, film races at angles to said lens and adapted to have films pass therethrough by a shuttle mechanism; a removable prism set interposed between said lens and films in said races to transmit images to both films, said prism set being mounted on a supporting block removably secured to said camera housing and having a prism set retaining member secured to said block and extending up and over said prism set with an opening in the top portion provided for the purpose of adjusting said prisms and then applying a securing element therein for retaining said prisms in adjusted position.

HARRY K. FAIRALL.